United States Patent
Musale et al.

(10) Patent No.: US 9,617,173 B2
(45) Date of Patent: Apr. 11, 2017

(54) METHOD FOR TREATMENT AND REUSE OF USED WATER STREAMS

(71) Applicant: Ecolab USA Inc., Naperville, IL (US)

(72) Inventors: Deepak A. Musale, Aurora, IL (US); Roger W. Fowee, Wheaton, IL (US)

(73) Assignee: ECOLAB USA INC., Naperville, IL (US)

( * ) Notice: Subject to any disclaimer, the term of this patent is extended or adjusted under 35 U.S.C. 154(b) by 635 days.

(21) Appl. No.: 13/783,496

(22) Filed: Mar. 4, 2013

(65) Prior Publication Data

US 2014/0246372 A1   Sep. 4, 2014

(51) Int. Cl.
| | | |
|---|---|---|
| C02F 1/00 | (2006.01) |
| C02F 1/44 | (2006.01) |
| C02F 9/00 | (2006.01) |
| B01D 61/00 | (2006.01) |
| C02F 1/28 | (2006.01) |
| C02F 1/56 | (2006.01) |

(52) U.S. Cl.
CPC ............... *C02F 1/447* (2013.01); *C02F 9/00* (2013.01); *C02F 1/28* (2013.01); *C02F 1/441* (2013.01); *C02F 1/445* (2013.01); *C02F 1/56* (2013.01)

(58) Field of Classification Search
CPC .... C02F 1/00; C02F 1/001; C02F 1/44; C02F 1/445; C02F 1/447; C02F 2001/002; C02F 2301/04; B01D 1/00; B01D 37/00; B01D 39/14; B01D 61/00; B01D 61/002; B01D 61/58; B01D 63/00; B01D 63/08

USPC .... 210/641, 652, 259, 321.6, 767, 634, 398, 210/500.21
See application file for complete search history.

(56) References Cited

U.S. PATENT DOCUMENTS

| | | | | |
|---|---|---|---|---|
| 4,968,431 | A * | 11/1990 | Bohnsack | C02F 1/28 210/669 |
| 6,299,766 | B1 * | 10/2001 | Permar | B01D 61/022 210/137 |
| 2006/0144789 | A1 * | 7/2006 | Cath | B01D 61/002 210/641 |
| 2010/0224476 | A1 * | 9/2010 | Cath | B01D 1/221 203/10 |

FOREIGN PATENT DOCUMENTS

WO   2008/085104 A1   7/2008

OTHER PUBLICATIONS

Morrow et al. (Sandia Report, Jan. 2011).*
Achilli et al. (J. of Membr. Sci., 2009).*

* cited by examiner

*Primary Examiner* — Allison Fitzsimmons
(74) *Attorney, Agent, or Firm* — Leydig, Voit & Mayer, Ltd.

(57) ABSTRACT

Methods for recovering energy and water from at least one energy-rich process water stream are provided. The methods optionally incorporate the use of filtration, reverse osmosis, ion exchange, water softening, forward osmosis, and membrane distillation. The methods can be used to recover energy and water from blowdown or condensate from a water-containing industrial process, which in certain embodiments may be a boiler system.

20 Claims, 3 Drawing Sheets

METHOD FOR TREATMENT AND REUSE OF USED WATER STREAMS

FIELD OF THE INVENTION

The disclosure is directed toward the recovery of water and energy in used water streams.

BACKGROUND

Boilers and steam generators are used to produce steam for heating process streams, for providing energy to do work, or simply to transfer energy to a desired location. While the heat exchange occurs, the steam is condensed into liquid and then typically recycled to the boiler. However, the condensate can sometimes contain corrosion products from the pipes as well as volatile organic compounds from treatment chemicals or natural organic compounds from a makeup water source. All of these contaminants affect the boiler performance and limit the number of cycles of concentration, and, thus, overall boiler efficiency. Therefore, purification of the condensate to remove corrosion products and organic compounds is sometimes desired, which can improve efficiency of the boiler system.

In addition to condensate, typical boiler operation includes blowdown that typically creates a waste stream having both water and energy value that can be recovered to further improve the efficiency and sustainability of the boiler system.

Several other water-containing industrial processes produce energy-rich water-containing streams that can be recovered similar to boiler condensate or blowdown. Non-limiting examples of these industrial processes may include food, dairy, beverage, landfill leachate, and biofuel processing.

By minimizing discharge of contaminated (a.k.a. "dirty") streams such as poor quality condensate and blowdown, an operator can reduce cost and possibly even generate more total steam. In addition, condensate and blowdown have latent heat content that can be saved or re-used by the boiler system, thus reducing the amount of fuel needed to generate steam.

SUMMARY OF THE INVENTION

In a first embodiment, the present disclosure is directed toward a method for improving efficiency of a water-containing industrial process. The method comprises providing an energy-rich process water stream and optionally filtering the energy-rich process water stream, thereby creating an energy-rich process water filtrate stream. The energy-rich process water stream or energy-rich process water filtrate stream is then fed to a membrane distillation unit. The membrane distillation unit comprises at least one membrane creating a heated side and a non-heated side within the membrane distillation unit. The energy-rich process water stream or energy-rich process water filtrate stream contacts the heated side of the at least one membrane, thereby creating a membrane distillate stream and an energy-rich aqueous liquid. Optionally, a salinated stream and the energy-rich aqueous liquid are fed into a forward osmosis (a.k.a. "direct osmosis" or "osmosis") unit. The forward osmosis unit comprises at least one membrane that creates a first side and a second side within the forward osmosis unit. The salinated stream is fed into the first side, and the energy-rich aqueous liquid is fed into the second side, thereby creating a concentrated stream and a diluted stream. A stream comprising at least one of the energy-rich aqueous liquid and the diluted stream is preliminarily purified using a technique selected from the group consisting of: reverse osmosis, ion exchange, water softening, and combinations thereof, thereby creating a purified makeup water stream. The purified makeup water stream and the membrane distillate stream are then fed into at least one heated thermal industrial water system.

In a second embodiment, the present disclosure is directed toward a method for improving efficiency of a water-containing industrial process. The method comprises providing an energy-rich process water stream and optionally filtering the energy-rich process water stream, thereby creating an energy-rich process water filtrate stream. The energy-rich process water stream or energy-rich process water filtrate stream is then optionally fed to a membrane distillation unit. The membrane distillation unit comprises at least one membrane creating a heated side and a non-heated side within the membrane distillation unit. The energy-rich process water stream or energy-rich process water filtrate stream contacts the heated side of the at least one membrane, thereby creating a membrane distillate stream and an energy-rich aqueous liquid. A salinated stream and an energy-rich second stream comprising at least one of the energy-rich process water stream, the energy-rich process water filtrate stream and the energy-rich aqueous liquid are fed into a forward osmosis unit. The forward osmosis unit comprises at least one membrane that creates a first side and a second side within the forward osmosis unit. The salinated stream is fed into the first side, and the energy-rich aqueous liquid is fed into the second side, thereby creating a concentrated stream and a diluted stream. A stream comprising the diluted stream is preliminarily purified using a technique selected from the group consisting of: reverse osmosis, ion exchange, water softening, and combinations thereof, thereby creating a purified makeup water stream. The purified makeup water stream and the membrane distillate stream are then fed into at least one heated thermal industrial water system.

In a third embodiment, the present disclosure is directed toward a method for improving efficiency of a heated thermal industrial water system. The method comprises providing an energy-rich process water stream from a boiler system and optionally treating the energy-rich process stream with a compound selected from the group consisting of a flocculant, a coagulant, an adsorbent, and combinations thereof, thereby creating a treated energy-rich process water stream. The energy-rich process water stream or treated energy-rich process water stream is filtered, thereby creating an energy-rich process water filtrate stream. The energy-rich process water filtrate stream is then fed to a membrane distillation unit. The membrane distillation unit comprises at least one membrane creating a heated side and a non-heated side within the membrane distillation unit. The energy-rich process water filtrate stream contacts the heated side of the at least one membrane, thereby creating a membrane distillate stream and an energy-rich aqueous liquid. A salinated stream and the energy-rich aqueous liquid are fed into a forward osmosis unit. The forward osmosis unit comprises at least one membrane that creates a first side and a second side within the forward osmosis unit. The salinated stream is fed into the first side, and the energy-rich aqueous liquid is fed into the second side, thereby creating a concentrated stream and a diluted stream. A stream comprising raw water and the diluted stream is preliminarily purified using reverse osmosis, thereby creating a purified makeup water stream.

The purified makeup water stream and the membrane distillate stream are then fed into the boiler system.

BRIEF DESCRIPTION OF THE DRAWINGS

The advantages of the present disclosure will become more readily apparent to those of ordinary skill in the relevant art after reviewing the following detailed description and accompanying drawings, wherein.

DETAILED DESCRIPTION OF THE INVENTION

Figure 1:
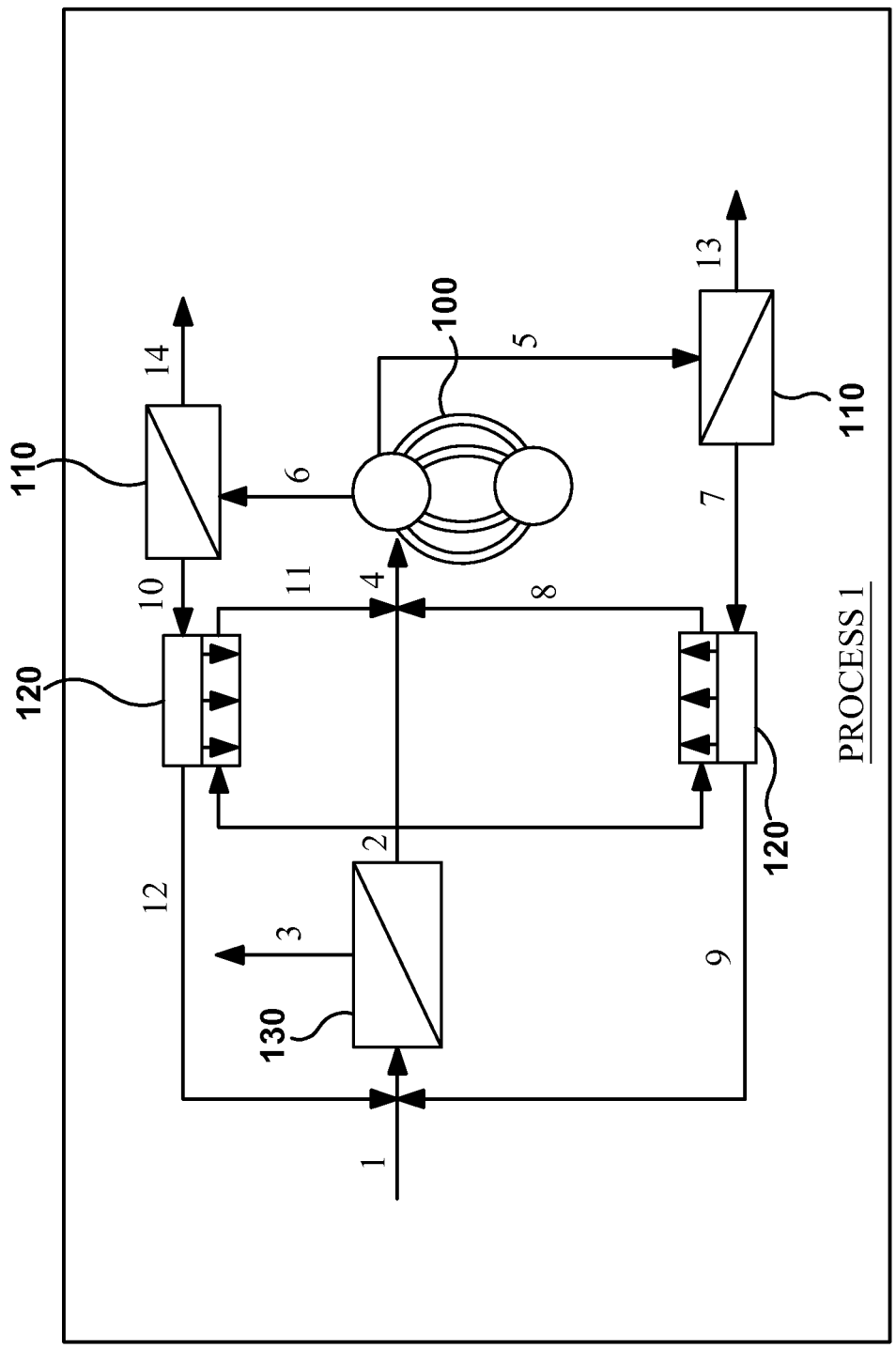
FIG. 1 illustrates an embodiment of a system that can be used to carry out the methods of the present disclosure.

While the embodiments described herein may take various forms, there is shown in the drawings and will hereinafter be described presently preferred embodiments with the understanding that the present disclosure is to be considered merely an exemplification and is not intended to limit the disclosure to the specific embodiments illustrated.

It should be further understood that the title of this section of this specification, namely, "Detailed Description of the Invention," relates to a requirement of the United States Patent Office, and does not imply, nor should be inferred to limit the subject matter disclosed herein.

Unless the context of the phrase would require one instead of the other, the terms "thermal" and "heat" are used interchangeably throughout this disclosure. Additionally, "thermal energy," heat energy," and "enthalpy" are used interchangeably through this disclosure as well.

Unless the context of the phrase would require one over the others, the terms "industrial process," "industrial operation," "industrial facility," "industrial plant," "industrial system," and other similar language are used interchangeably. Furthermore, a thermal industrial water system (and sub-types thereof; as further defined below) and a boiler system (as further defined below) are considered to be types of industrial processes. A "water-containing" industrial process uses water in some amount or form, though the overall industrial process may contain one or more other compounds. The terms "industrial process" and "water-containing industrial process" are generic to "thermal industrial water system," which itself is generic to "boiler system." While a cooling water system can be a thermal industrial water system, a "heated" industrial water system includes boiler systems, as defined herein, as well as hot water systems, which may be used to impart heat to another industrial process or space while not generating steam.

The terms "contaminated" and "dirty" are each used to describe a substance that contains an undesirable quantity of at least one other substance. For example, an aqueous liquid would be said to be contaminated (or dirty) if particulate matter was undesirable above a certain threshold within the aqueous liquid, and the particular aqueous liquid had a concentration of particulate matter that exceeded the certain threshold.

As it pertains to this disclosure, an "energy sink" is the lowest energy-containing stream in an industrial process. Because an energy sink has the least heat energy, it is the lowest thermal well for the exchange of thermal energy between streams in the industrial process. Frequently in water-containing industrial processes, raw water entering the industrial process is an energy sink. Raw water may come from a variety of sources including but not limited to a lake, river, reservoir, well, ocean, sea, municipal water line, reclaimed municipal grey water, or industrial wastewater. It is possible that a non-aqueous stream used in the process may be an energy sink as well. Non-limiting examples of a non-aqueous energy sink include gas streams (e.g., combustion air, fuel), a liquid fuel stream, or a product or process stream within the industrial facility that is non-aqueous or mostly a substance other than water.

As it pertains to this disclosure, "energy-rich" is used to describe a stream has enthalpy above that of an energy sink. An energy-rich stream also has an energy content above what is required for final disposition or use of that stream. In other words, an energy-rich stream is considered to have excess energy beyond its own needs. The energy-rich stream provides a potential energy source that, if successfully transferred to an energy-deficient stream, provides benefit by raising the energy content of the energy-deficient stream, as necessary or desired within the industrial process. More than one energy-rich stream may exist within a given industrial process. While fitting within the definition of "energy-rich," lower energy streams may exist that are not "energy sinks," and this topic is further discussed below.

An energy-rich stream typically will have excess energy that can be utilized in one or both of two manners, thermal and hydraulic. An energy-rich stream can transfer excess thermal energy from it to a lower energy content stream as matter of heat recovery within the industrial process. The enthalpy of the energy-rich stream is then decreased in the heat exchange, while the enthalpy of the energy poor stream is increased by the transfer. Since heat transfer requires a difference in energy between the two streams, by necessity the heat content of the originally energy-rich stream can never drop lower than the heat content of the originally energy-deficient stream. By recovering and transferring the thermal energy from an energy-rich to an energy-deficient stream, the industrial process will need to input less total energy into the process as heat to achieve its required thermal operating conditions.

In some cases in addition to or in alternative to being energy-rich in terms of thermal energy, a given fluid stream may be energy-rich in terms of hydraulic energy (e.g., mechanical energy because of elevated pressure) relative to what is required for that stream. The excess hydraulic energy has value because hydraulic energy is required to move a stream through piping and equipment in the industrial facility. Recovering or transferring excess hydraulic energy from an energy-rich stream to a stream having lesser energy allows for improved efficiency in the industrial plant. By recovering the hydraulic energy, the operator of the industrial facility may use less energy operating pumps and compressors, and less thermal energy may be wasted while moving fluid streams through the industrial process.

As it pertains to this disclosure, "energy-deficient," "energy-poor," "less energy," and such terms indicate that a stream has a lower energy content than that of a comparative energy-rich stream, allowing for the potential to transfer energy from the energy-rich stream to the energy-deficient stream. The energy-deficient stream need not be so low in energy content as to constitute an energy sink, but by definition it cannot be lower in energy content than the energy sink.

As it pertains to this disclosure, "makeup water" means an aqueous stream provided to the thermal industrial water system whereby fresh or new water is introduced to replenish water that has left or been consumed in the thermal industrial water system. In some cases the makeup water to the system could be raw water (e.g., an incoming water stream for the entire plant/process) as described in the previously discussed "energy sink" definition and further discussed below. In other systems, the makeup water has been pre-processed or prepared by various pre-treatment equipment, prior to its introduction to the particular thermal industrial water system. The use of makeup water in the thermal industrial water system is typically required so as to keep and establish a mass balance around the thermal industrial water system, such that incoming water equals all of the water losses from the thermal industrial water system.

As it pertains to this disclosure, "filtrate" refers to any fluid that has passed through at least one filtration device of any kind, including membrane filtration devices. In other words, the terms "filtrate" is generic to the term "permeate."

As it pertains to this disclosure, "purify" (and its conjugated forms) refers to undergoing a treatment process to remove undesirable or harmful matter from a substance. A stream is purified when it has removed from it a quantity of undesirable or harmful matter that may be dissolved, suspended, or particulate in nature. Purification of a stream may occur by physical separation limiting the passing of all or a quantity of the undesired dissolved, suspended, or particulate matter from one stream to another stream. Purification of a stream may also occur by chemical treatment, or a combination of chemical treatment and physical separation. The purified stream by necessity will contain a lesser quantity of the undesired matter than the stream did before purification. Non-limiting examples of purification processes include filtration, membrane separation, distillation (membrane and otherwise), evaporation, ion exchange, adsorption, settling, flotation, centrifugation, reverse osmosis, and forward osmosis. Multiple purification methods may be required to reach a desired purity that is required for a particular process stream, depending on the complex nature of industrial processes as well as contamination types and amounts.

As it pertains to this disclosure, "thermal industrial water system" (a.k.a. "water plant" or "water process") refers to an industrial process that employs water that is either heated or cooled. Most industrial processes require some form of water to operate, whether it be direct or indirect contact, pure or impure, liquid or vapor, or any combination or all of the aforementioned. Water is typically an excellent, cost-effective, overall safe-to-use fluid that allows the necessary transfer of thermal energy between various parts of an industrial process. Some portions of an industrial process may require heating and others may require cooling. Water streams can be employed to allow for this energy to be transferred successfully.

Additionally, some processes themselves consume water by necessity in making their products or providing the service that their facility provides. Even in these cases, the energy content of consumed water is frequently critical to the overall success of the industrial process. The methods of this disclosure could be beneficial when employed with any industrial process that has at least one energy-rich aqueous stream that would require or benefit from purification.

Non-limiting examples of industrial processes where the disclosed methods may be useful include the following: boiler systems; other steam-generating systems; paper mills (new and recycle paper); steel mills; refineries; chemical processing plants; pharmaceutical plants; food processing plants; dairy processing plants; mineral refining/purification plants; heating, ventilation, and air conditioning ("HVAC") systems; electrical power plants (fossil fuel and nuclear); and municipal water plants. Within the food processing plants and dairy processing plants (to which a dairy processing plant is a type of food processing plant), non-limiting specific examples of the aforementioned plants wherein the disclosed methods may be useful include the following: coffee processing, sugar processing, milk processing, whey processing, soup processing, beverage processing, and tomato (juice, paste, etc.) processing, all of which are known to typically have condensate streams. Boiler systems and other steam-generating systems are discussed in more detail below, and the terms "boiler," "boiler system," "steam system," and "other steam system" are used interchangeably in the present disclosure to describe any steam generating system.

A thermal industrial water system is considered to include any of these or similar processes where the thermal energy of one or more of the streams is important to the overall operation of the industrial system. This importance could be for economic, performance, and/or productivity reasons of the process. Virtually all such industrial systems described herein include and/or employ at least one thermal industrial water system.

Boiler systems by necessity are large consumers of thermal energy. Boiler systems require purified water feed streams and typically result in the production of more concentrated waste streams. The present disclosure provides methods for such industrial processes to transfer energy from typically wasted, energy-rich streams to other streams, as well as purification of water within the typically wasted, energy-rich streams for use in a heated thermal industrial water system. Employing the methods of the present disclosure can improve heat recovery of an industrial process and overall efficiency. When coupled with the added benefit of water purification, the overall efficiency of the industrial process can be significantly improved, resulting in lower operating costs and potentially less environmental impact resulting from lower overall water consumption and less discharge of exhaust waste. The present disclosure is particularly pertinent to recovering water and energy from one or more boiler systems.

Some steam generating systems do not directly burn fuel to produce steam. For some industrial processes, sufficient waste heat exists in one or more non-aqueous process streams to boil water, which is an efficient heat removal method for cooling these non-aqueous process streams. Such non-aqueous process streams can be used as non-fired steam generators, thereby providing recovered energy. The steam generator may not directly burn fuel, instead using the waste energy from a previously fired (i.e., fuel-consuming) process. An example of a previously fired process is a gas fired turbine, in which a fuel (e.g., methane) is burned in essentially a jet engine. The hot exhaust gas from the engine turns a shaft that in turn moves an electrical turbine. The spent exhaust gas is frequently sent to a waste-heat (i.e., non-fired) boiler to generate steam. This type of combination of gas-fired turbine and waste heat boiler is frequently referred to as a "cogeneration" process. The steam generator is frequently called a heat recovery steam generator ("HRSG").

Another example of a steam generation system that does not require direct firing is a geothermal steam production system. In geothermal steam production systems, at least one hot and/or pressurized liquid stream is extracted from geological formations in the earth. The pressure of this stream is reduced by the geothermal steam production system to allow for the flashing of vapor from the hot liquid. The geothermal steam production system produces energy-rich steam and energy-rich liquid water. In a conventional geothermal steam production system, the energy-rich liquid water is frequently wasted.

As it pertains to this disclosure, the terms "water stream" and "aqueous stream" are used interchangeably and refer to a fluid stream entering, leaving, or within an industrial process that comprises water (i.e., a "water-containing industrial process"). While water streams primarily comprise water, a particular water stream may include one or more compositions other than water. A water stream's basic fluid properties (e.g., its ability to flow and to be moved throughout the plant) are typically dependent on the water content of the stream. Many industrial processes include non-water streams and other essentially waterless streams that have thermal importance as well. Such examples of non-water streams may include a hydrocarbon stream in a refinery or chemical plant, a fuel or exhaust stream of a combustion process, or a gas stream such as air, oxygen, or nitrogen.

For water streams, it is important to point out that the stream may be a liquid phase, a vapor phase (e.g., gas phase or steam phase), or a mixed phase. A mixed phase is referred to as "wet steam." Steam can be either saturated steam or superheated steam.

While boiler blowdown is the most common form of blowdown, other industrial processes may also employ blowdown techniques to eject contamination from the process. As it pertains to this disclosure, "blowdown" refers to a stream that is removed from a heated, pressurized industrial process in order to limit the concentration and buildup of undesirable or harmful matter. The industrial process is typically a heated thermal industrial water system, and even more typically, a boiler system. Depending on the context, the terms "blowdown," "blowdown water," and "blowdown stream" may be used interchangeably in the present disclosure. The undesirable or harmful matter may be dissolved, suspended, or particulate in nature. Blowdown is typically a waste stream. The term "blowdown" can also be used as a verb to refer to the process of removing the aforementioned aqueous stream. Blowdown is typically performed on boiler systems. Usually blowdown is an energy-rich, dirty stream.

Virtually any impurity in boiler makeup water concentrates within the boiler. The increase in contaminant concentration is driven by the fact that relatively pure steam is produced, thereby filling the overall boiler system. Without remediation, an operating boiler will build impurities in the boiler water over time to the point where scale and deposits form. Scale and deposits can limit heat transfer within the boiler possibly giving rise to corrosion mechanisms within the boiler and thereby causing material weakening and/or loss of pressure vessel integrity. The loss of steam quality or purity can also occur due to excess foaming caused by high salt content in the boiler water. For at least these reasons, blowdown is typically part of routine boiler operation in order to limit the concentration and buildup of contaminants in the boiler.

Blowdown typically has significant impurities that often limit its useful application in an industrial process. Blowdown is generally discharged to an industrial plant's overall waste stream or to a municipal sewer system. Beyond the value of the discharged water within the blowdown, blowdown contains thermal and mechanical energy, and is typically a very energy-rich stream as previously defined. If the excess energy could be transferred from blowdown to one or more energy-deficient streams, and if blowdown could be purified or aid in the purification of other water streams, the efficiency of the overall industrial process could be improved.

When released from the heated, pressurized thermal industrial water system, blowdown is usually in liquid form. Depending on the eventual pressure and stages of heat removal from blowdown, it can at times become either a mixed phase (liquid and vapor) and or vapor phase stream.

As it pertains to this disclosure, "condensate" refers to steam that has become condensed to liquid form. In boiler systems, condensate is typically collected and returned to the boiler system for reuse. The boiler produces steam which in turn is, for example, sent to drive a steam turbine (electrical energy generation or mechanical device operation), heat an industrial process, operate an HVAC system, or some other thermally driven industrial process. As heat is extracted by any of these processes, the steam condenses to liquid form. The condensate is typically collected and returned to the boiler system for reuse. The overall boiler system typically recycles as much condensate as possible to help minimize the amount of makeup water fed into the boiler system as well as to conserve the energy within the energy-rich condensate.

Typically, a substantial amount of the condensate is returned to the boiler because it is pure enough for direct reuse in the boiler system. By directly reusing such "clean" condensate, the thermal content and value as a reasonably pure water stream benefits the overall operating efficiency of the boiler system. However, a portion of the condensate from the boiler system may become contaminated. Such contamination may be predictable (routine or periodic) or unpredictable (episodic). Compared to raw water entering the plant, even "dirty" condensate is typically reasonably pure. However, it may not be pure enough to be directly returned to the boiler system.

Non-limiting examples of contaminants that may be found in the condensate include corrosion product from plumbed surfaces and unintentional contamination from one or more industrial processes. Without purification, dirty condensate may need to be discarded as a waste stream because of concern stemming from the impact of the impurity on the boiler system. The methods of the present disclosure can be used to purify and reuse dirty condensate that may otherwise and more typically be discarded.

As it pertains to this disclosure, "raw water" refers to incoming water into an industrial process prior to treatment of any kind. As previously mentioned, raw water may come from a variety of sources including but not limited to a lake, river, reservoir, well, ocean, sea, municipal water line, reclaimed municipal grey water, or industrial wastewater. Raw water is typically a dirty stream that is at least energy-poor and very typically an energy sink.

The incoming raw water to the industrial plant is almost always too concentrated in contaminants to allow for its direct feed into a thermal industrial water system. If directly fed, raw water often quickly leads to scale, deposit, and/or corrosion in the thermal industrial water system, problems that would seriously impact the safe and cost-effective use of the thermal industrial water system. Furthermore, for typical boiler systems, the required purity of the steam would be negatively impacted by the boiling of unpurified raw water. Some raw water may be pure enough for use in a boiler without treatment. However, raw water will usually need to be purified prior to its introduction into the boiler system, with at least one and generally several contaminants removed. Reverse osmosis can be used to purify raw water, creating a reject (i.e., salinated) stream and a purified water stream (i.e., contaminant-poor). Other non-limiting methods of purifying raw water include ion exchange and water softening.

When used in a boiler system, raw water is always energy-poor as compared to potential waste streams from the boiler system. By successfully transferring energy from any of the energy-rich waste streams to an energy-poor incoming raw water stream, the overall plant efficiency, cost effectiveness, and environmental impact can be improved.

As it pertains to this disclosure, the terms "makeup water," "makeup stream," and "makeup water stream" refer to water or a stream that is added to a thermal industrial water system to replace water that leaves the system. By definition when used in a boiler system, makeup water must be of sufficient purity to be able to be fed to the boiler in order to ensure safe and proper operation. Similarly to raw water, makeup water is generally energy-poor as compared to waste streams from the boiler system. Makeup water does not have sufficient enthalpy to make steam. Thus, if desired, energy must be imparted to makeup water in order to make steam, making it a candidate for receiving excess heat from other streams.

As it pertains to this disclosure, "other source water" refers to water entering the thermal industrial water system from another area of the plant that is not the thermal industrial water system. Besides raw water, other water sources may be locally used as a water source by a boiler system. This other water source could be a waste or excess water stream from another section or process within the industrial plant or from another industrial plant altogether. In general these waste streams, which become recycle streams, are generally of low purity and must be purified before use as makeup water for a boiler system. Additionally, these streams are typically energy-poor and thus could be candidates for energy recovery from energy-rich streams.

As it pertains to this disclosure, "waste stream" refers to a stream that is removed from an industrial process and that is not returned to any industrial process. Although the present disclosure provides methods to reduce the total water mass flow leaving the industrial process and/or thermal industrial water system as a waste stream, there will be some required waste flow from one or more unit operations in the industrial process and/or thermal industrial water system. Through the use of one or more methods of the present disclosure, the waste streams of the methods will generally have elevated contaminant concentrations. Whenever possible and practical, the enthalpy and mechanical energy content of the waste streams should be less than in the absence of practicing any of the methods of the present disclosure.

As it pertains to this disclosure, "salinated stream" refers to a stream that has a sufficient dissolved species (i.e., ionic species; e.g., salt) concentration to act as a draw stream in a forward osmosis unit. Depending upon the industrial process, various ionic species may be present in the salinated stream, including, but not limited to sodium, chloride, potassium, calcium, magnesium, aluminum, barium, strontium, bromide, sulfate, nitrate, phosphate, and various combinations thereof. In certain embodiments that employ at least one forward osmosis unit, the forward osmosis is driven by an ionic species concentration gradient across two streams that are separated by a membrane. A stream having a greater ionic species (e.g., salt) concentration draws water from a stream having a lesser ionic species concentration (i.e., a feed stream). The stream having the lesser ionic species concentration may perhaps have a greater suspended solids concentration than the draw stream. The draw (i.e., salinated) stream becomes diluted by the water drawn across the membrane from the stream having the lower ionic species concentration.

As it pertains to this disclosure, ordinal adjectives (i.e., "first," "second," etc.) are sometimes employed. Unless the context clearly indicates otherwise, ordinal adjectives are used merely for identification purposes only. For example, a forward osmosis unit may comprise at least one membrane that creates a first side and a second side. "First" and "second" are used merely to denote that the two sides are different, and not that one comes before the other.

In a first embodiment, the present disclosure is directed toward a method for improving efficiency of a water-containing industrial process. The method comprises providing an energy-rich process water stream and optionally filtering the energy-rich process water stream, thereby creating an energy-rich process water filtrate stream. The energy-rich process water stream or energy-rich process water filtrate stream is then fed to a membrane distillation unit. It should be understood that, in certain embodiments, a first portion of the energy-rich process water stream may be filtered (creating an energy-rich process water filtrate stream) and a second portion of the energy-rich process water stream may be fed directly to the membrane distillation unit. Furthermore, it should also be understood that the disclosed first embodiment contemplates that all or only a portion of the provided energy-rich process water stream is utilized in the disclosed method. The membrane distillation unit comprises at least one membrane creating a heated side and a non-heated side within the membrane distillation unit. The energy-rich process water stream or energy-rich process water filtrate stream contacts the heated side of the at least one membrane, thereby creating a membrane distillate stream and an energy-rich aqueous liquid. Optionally, a salinated stream and the energy-rich aqueous liquid are fed into a forward osmosis unit. The forward osmosis unit comprises at least one membrane that creates a first side and a second side within the forward osmosis unit. The salinated stream is fed into the first side, and the energy-rich aqueous liquid is fed into the second side, thereby creating a concentrated stream and a diluted stream. A stream comprising the energy-rich aqueous liquid or the diluted stream is preliminarily purified using a technique selected from the group consisting of: reverse osmosis, ion exchange, water softening, and combinations thereof, thereby creating a purified makeup water stream. In certain embodiments according to the first embodiment, the preliminary purification technique is reverse osmosis. The purified makeup water stream and the membrane distillate stream are then fed into at least one heated thermal industrial water system.

In a second embodiment, the present disclosure is directed toward a method for improving efficiency of a water-containing industrial process. The method comprises providing an energy-rich process water stream and optionally filtering the energy-rich process water stream, thereby creating an energy-rich process water filtrate stream. The energy-rich process water stream or energy-rich process water filtrate stream is then optionally fed to a membrane distillation unit. The membrane distillation unit comprises at least one membrane creating a heated side and a non-heated side within the membrane distillation unit. The energy-rich process water stream or energy-rich process water filtrate stream contacts the heated side of the at least one membrane, thereby creating a membrane distillate stream and an energy-rich aqueous liquid. A salinated stream and an energy-rich second stream comprising at least one of the energy-rich process water stream, the energy-rich process water filtrate stream and the energy-rich aqueous liquid are fed into a forward osmosis unit. It should be understood that, in certain embodiments, a first portion of the energy-rich process water stream may be filtered (creating an energy-rich process water filtrate stream) and/or distilled by a membrane distillation unit, and a second portion of the energy-rich process water stream may be fed directly to the forward osmosis unit. Furthermore, it should also be understood that the disclosed second embodiment contemplates that all or only a portion of the provided energy-rich process water stream is utilized in the disclosed method. The forward osmosis unit comprises at least one membrane that creates a first side and a second side within the forward osmosis unit. The salinated stream is fed into the first side, and the energy-rich aqueous liquid is fed into the second side, thereby creating a concentrated stream and a diluted stream. A stream comprising the diluted stream is preliminarily purified using a technique selected from the group consisting of: reverse osmosis, ion exchange, water softening, and combinations thereof, thereby creating a purified makeup water stream. In certain embodiments according to the second embodiment, the preliminary purification technique is reverse osmosis. The purified makeup water stream and the membrane distillate stream are then fed into at least one heated thermal industrial water system.

In a third embodiment, the present disclosure is directed toward a method for improving efficiency of a heated thermal industrial water system. The method comprises providing an energy-rich process water stream from a boiler system and optionally treating the energy-rich process stream with a compound selected from the group consisting of a flocculant, a coagulant, an adsorbent, and combinations thereof, thereby creating a treated energy-rich process water stream. It should be understood that the disclosed third embodiment contemplates that all or only a portion of the provided energy-rich process water stream is utilized in the disclosed method. The energy-rich process water stream or treated energy-rich process water stream is filtered, thereby creating an energy-rich process water filtrate stream. The energy-rich process water filtrate stream is then fed to a membrane distillation unit. The membrane distillation unit comprises at least one membrane creating a heated side and a non-heated side within the membrane distillation unit. The energy-rich process water filtrate stream contacts the heated side of the at least one membrane, thereby creating a membrane distillate stream and an energy-rich aqueous liquid. A salinated stream and the energy-rich aqueous liquid are fed into a forward osmosis unit. The forward osmosis unit comprises at least one membrane that creates a first side and a second side within the forward osmosis unit. The salinated stream is fed into the first side, and the energy-rich aqueous liquid is fed into the second side, thereby creating a concentrated stream and a diluted stream. A stream comprising raw water and the diluted stream is preliminarily purified using reverse osmosis, thereby creating a purified makeup water stream. The purified makeup water stream and the membrane distillate stream are then fed into the boiler system.

In certain embodiments of the first, second and third embodiments, the energy-rich process water stream that is utilized has been discharged from a heated thermal industrial water system. In certain embodiments, the energy-rich process water stream is a blowdown water from a boiler or hot water system. In certain embodiments, the energy-rich process water stream is a condensate stream. In certain embodiments, the energy-rich process water stream is a condensate water stream from an industrial process selected from the group consisting of a boiler system; food processing; dairy processing; beverage processing; landfill leachate processing; biofuel processing; and combinations thereof.

In certain embodiments according to the first, second and third embodiment, the methods of the present disclosure include filtering of the energy-rich process water stream. In certain embodiments, the filtration is selected from the group consisting of: ultrafiltration, microfiltration, media filtration, and combinations thereof. In certain embodiments employing ultrafiltration and/or microfiltration, the filters comprise at least one membrane, which may be polymeric or ceramic. In certain embodiments, the membrane is configured in one of the following manners: spiral wound, tubular, single-bore capillary, multi-bore capillary, hollow fiber, or plate-frame. In certain embodiments, the membranes have a pore size in the range of from 0.003 micron to 10 micron. In embodiments that employ ultrafiltration and/or microfiltration, the ultrafiltration and/or microfiltration may be submerged into a vessel or external to a vessel, and either or both of the ultrafiltration and microfiltration may be operated in dead-end flow or cross-flow mode.

In certain embodiments according to the first, second and third embodiment, the energy-rich process water stream may be chemically treated with one or more coagulants, one or more flocculants, one or more adsorbents, or combinations thereof prior to being filtered.

Non-limiting examples of typical coagulants that may be used to practice the methods of this disclosure include cationic polymers, anionic polymers, amphoteric polymers, zwitterionic polymers, inorganic salts, and combinations thereof. In certain embodiments, the inorganic salts are selected from the group consisting of iron salts, aluminum salts, and combinations thereof.

Non-limiting examples of typical flocculants that may be used to practice the methods of this disclosure include cationic polymers, anionic polymers, amphoteric polymers, zwitterionic polymers, and combinations thereof.

As it pertains to this disclosure, "cationic polymer" refers to a polymer having an overall positive charge. The cationic polymers of this disclosure may be prepared by polymerizing one or more cationic monomers, by copolymerizing one or more nonionic monomers and one or more cationic monomers, by condensing epichlorohydrin and a diamine or polyamine, or condensing ethylenedichloride and ammonia or formaldehyde and an amine salt. The cationic polymer is water soluble. Non-limiting examples of cationic polymers that may be employed in embodiments of the present invention include polydiallyldimethylammonium chloride ("polyDADMAC"); polyethyleneimine; polyepiamine; polyepiamine crosslinked with ammonia or ethylenediamine; condensation polymer of ethylenedichloride and ammonia; condensation polymer of triethanolamine and tall oil fatty acid; poly(dimethylaminoethylmethacrylate sulfuric acid salt); and poly(dimethylaminoethylacrylate methyl chloride quaternary salt), copolymers of acrylamide, acrylate-acrylamide copolymers (e.g., "AcAm"), and one or more cationic monomers selected from the group consisting of: diallyldimethyl ammonium chloride; dimethylaminoethylacrylate methyl chloride quaternary salt; dimethylaminoethylmethacrylate methyl chloride quaternary salt; and dimethylaminoethylacrylate benzyl chloride quaternary salt (DMAEA.BCQ).

As it pertains to this disclosure, "anionic polymer" refers to a polymer having an overall negative charge. Anionic polymers are derived from anionic monomers. Water soluble anionic polymers are soluble in water. Water soluble anionic polymers include polysaccharides such as polygalacturonic acid, polyglucuronic acid, polymannuconic acid, alginic acid, pectins and their sodium salts, carboxymethyl cellulose, carboxymethyl starch, monophosphate starch, polylacrylic acid, polyacrylates, polymethacrylates, copolymers of acrylate/styrene sulfonate, poly(2-acrylamido, 2-methyl propane sulfonic acid-sodium salt ("poly(AMPS-Na)"), and polyvinyl sulfonates).

As it pertains to this disclosure, "amphoteric polymer" refers to a polymer derived from both cationic monomers and anionic monomers, and, possibly, other non-ionic monomer(s). Amphoteric polymers can have a net positive or negative charge. The amphoteric polymer may also be derived from zwitterionic monomers and cationic or anionic monomers and possibly nonionic monomers. The amphoteric polymer is water soluble. Non-limiting examples of amphoteric polymers that may be employed in embodiments of the present invention include dimethylaminoethyl acrylate methyl chloride quaternary salt (DMAEA.MCQ)/acrylic acid copolymer, diallyldimethylammonium chloride/acrylic acid copolymer, dimethylaminoethyl acrylate methyl chloride salt, N,N-dimethyl-N-methacrylamidopropyl-N-(3-sulfopropyl)-ammonium betaine copolymer, acrylic acid, N,N-dimethyl-N-methacrylamidopropyl-N-(3-sulfopropyl)-ammonium betaine copolymer and DMAEA.MCQ/acrylic acid/N,N-dimethyl-N-methacrylamidopropyl-N-(3-sulfopropyl)-ammonium betaine terpolymer.

As it pertains to this disclosure, "zwitterionic polymer" refers to a polymer composed from zwitterionic monomers and, possibly, other non-ionic monomer(s). In zwitterionic polymers, all the polymer chains and segments within those chains are rigorously electrically neutral. Therefore, zwitterionic polymers represent a subset of amphoteric polymers, necessarily maintaining charge neutrality across all polymer chains and segments because both anionic charge and cationic charge are introduced within the same zwitterionic monomer. The zwitterionic polymer is water soluble. Non-limiting examples of zwitterionic polymers that may be employed in embodiments of the present invention include homopolymers such as the homopolymer of N,N-dimethyl-N-(2-acryloyloxyethyl)-N(3-sulfopropyl) ammonium betaine, copolymers such as the copolymer of acrylamide and N,N-dimethyl-N-(2-acryloyloxyethyl)-N-(3-sulfopropyl) ammonium betaine, and terpolymers such as the terpolymer of acrylamide, N-vinyl-2-pyrrolidone, and 1-(3-sulfopropyl)-2-vinylpyridinium betaine.

Non-limiting examples of typical adsorbents that may be used to practice the methods of this disclosure include activated carbons, natural clays, synthetic clays, polymeric resins, nanoparticles, and combinations thereof.

In certain embodiments according to the first, second and third embodiment, the methods of the present disclosure employ at least one membrane distillation unit. The at least one membrane distillation unit is selected from the group consisting of at least one direct contact membrane distillation unit, at least one vacuum membrane distillation unit, at least one air gap membrane distillation unit, at least one sweeping gas membrane distillation unit, and combinations thereof. In certain embodiments, the at least one membrane distillation unit is at least one direct contact membrane distillation unit. In certain embodiments, at least a portion of the purified makeup water stream passes through the at least one membrane distillation unit on the non-heated side to recover the membrane distillate.

As previously mentioned, for embodiments employing at least one membrane distillation unit, each of the at least one membrane distillation units comprises at least one membrane. In certain embodiments, one or more of the at least one membrane distillation units comprises at least one polymeric membrane. In certain embodiments, one or more of the at least one polymeric membrane is constructed of polyethylene, polypropylene, or a fluorinated polymer or copolymer. Non-limiting examples of fluorinated polymers or copolymers include polytetrafluoroethylene ("PTFE") and polyvinylidene fluoride ("PVDF"). In further embodiments, one or more of the at least one membrane distillation units comprises at least one ceramic membrane.

In embodiments that employ at least one membrane distillation unit, the membrane is configured in one of the following manners: spiral wound, tubular, single-bore capillary, multi-bore capillary, hollow fiber, or plate-frame. In certain embodiments, the membrane has a pore size in the range of from 0.003 micron to 10 micron. In embodiments that employ at least one membrane distillation unit, operation of one or more of the at least one membrane distillation units may be operated co-current or countercurrent with respect to hot and cold solution flow directions in a single system. Such operation may be chosen independently for each membrane distillation unit.

In certain embodiments, the methods of the present disclosure employ at least one forward osmosis unit. In certain embodiments, a reject stream from preliminary purification acts as the draw (i.e., salinated) stream for one or more of the at least one forward osmosis units. The term "draw" is a term of art relating to forward osmosis systems and is used to denote a stream having a concentration of dissolved substances (i.e., ions) that enters the forward osmosis unit. Water is drawn into the draw stream from the "feed" stream, which has less dissolved substances but likely more particulate matter than the draw stream. In certain embodiments, the preliminary purification technique is selected from the group consisting of: reverse osmosis, ion exchange, water softening, and combinations thereof. In certain embodiments, the preliminary purification technique is reverse osmosis.

In embodiments employing at least one forward osmosis unit, one or more of the at least one forward osmosis units comprise at least one membrane that separates each forward osmosis unit into a first side and a second side. The salinated stream acts as the draw stream and is fed into the first side, while the energy-rich aqueous liquid acts as the "feed" stream and is fed into the second side. Each forward osmosis unit thereby creates a concentrated (i.e., reject) stream and a diluted (i.e., recyclable) stream. In certain embodiments, the at least one membrane of the at least one forward osmosis system comprises a composition selected from the group consisting of a cellulose ester, a polyamide, a polyimide, and combinations thereof.

In certain embodiments, at least one membrane of the at least one forward osmosis unit is configured in one of the following manners: spiral wound, tubular, single-bore capillary, multi-bore capillary, hollow fiber, or plate-frame. In certain embodiments, at least one membrane of the at least one forward osmosis unit has a support (i.e., backing).

For embodiments employing at least one forward osmosis unit but without a reverse osmosis reject stream or ion exchange reject stream, or having a reverse osmosis reject stream or ion exchange reject stream that, for example, provides insufficient economic benefit for forward osmosis operation, such an embodiment could utilize one or more salinated streams provided from another part of the industrial facility in addition to or instead of any reverse osmosis reject stream or ion exchange reject stream, if available, for feed into the at least one forward osmosis unit. Such streams may originate from an industrial process that is on site with the forward osmosis unit. For embodiments employing at least one forward osmosis unit, flow may be co-current or countercurrent with respect to feed and draw streams, and the at least one forward osmosis unit may be operated in single-pass, partial recirculation, or (at times) full recirculation modes. The forward osmosis unit, when present, may be operated in forward osmosis mode or pressure retarded osmosis mode.

In certain embodiments, the heated thermal industrial water system into which the purified makeup water stream and the membrane distillate stream are fed (i.e., the recovered water) is the water-containing industrial process. In other words, the recovered water may be recycled into the heated thermal industrial water system from which it originated. However, the recovered water may originate from one process and enter a different thermal industrial water system for the first time via the methods of the present disclosure. Several related options are discussed herein.

Referring to the figures, it is important to note that, in each figure, essentially two separate embodiments of the methods of the present disclosure are illustrated: a first embodiment to handle blowdown 5 and a second embodiment to handle condensate 6. Any particular user may choose to do only blowdown recovery, only condensate recovery, or both depending on the value to the user. Furthermore, the figures do not illustrate the addition of a coagulant, a flocculant, and/or an adsorbent to the blowdown 5 or the condensate 6, but the step can be optionally performed at said streams 5 and 6 using known techniques. The figures further illustrate separate filtration 110 and membrane distillation units 120 for the blowdown 5 and condensate 6. While separate equipment would likely improve the efficiency of the disclosed methods because of differences in chemical makeup of the different streams, it is within the purview of this disclosure that the blowdown 5 and condensate 6 could be combined and optionally treated prior to being passed through a single (or set of) filtration(s) 110 and optionally a single (or set of) membrane distillation unit(s) 120. Such a configuration could theoretically cut capital and operating cost by eliminating perceived redundancies, as long as such a configuration is capable of handling the combined blowdown 5 plus condensate 6 stream.

While the figures illustrate embodiments that recycle energy-rich boiler system water back to the boiler system itself, it is within the purview of the disclosure that the energy-rich process water streams 5 and 6 could come from another water-containing industrial process, be purified using the methods of the present disclosure, and be introduced into a heated thermal industrial water system as previously defined, or into another water-containing industrial process, thermal or otherwise, that uses reasonably pure water.

For all the figures, it is important to note that, while the filtrations 110 and the membrane distillation units 120 are labeled with the same label numbers, each may have varying constructions (membrane and otherwise) depending on several factors, including chemical species likely found in each stream, pH, temperature, pressure, flow rate, etc.

Turning to the figures, FIG. 1 illustrates an embodiment of a system that can be used to carry out the methods of the present disclosure. For the illustrated embodiment of FIG. 1, a boiler system 100 produces steam (not shown). Liquid emissions of the boiler system 100 include blowdown 5 and condensate 6, each of which are examples of energy-rich process water streams, and each of which may be optionally treated with a coagulant (not shown), a flocculant (not shown), and/or an adsorbent (not shown).

Turning to the blowdown 5, the (optionally treated) blowdown water stream 5 (an energy-rich process water stream) is optionally filtered 110, thereby producing a filtration reject stream 13 and a filtrate 7, the filtrate being an example of an energy-rich process water filtrate stream. The reject stream 13 may be further processed or removed from the process depending on its value to the user. In the illustrated embodiment, the filtrate 7 is shown being optionally fed into a heated side of a membrane distillation unit 120. When present, the filtrate 7 is optionally distilled via membrane distillation by the at least one membrane distillation unit 120, thereby creating a membrane distillate (illustrated by the up arrows inside the lower membrane distillation unit 120, and collected and transported via stream 8, and then 4) and a membrane distillation reject stream 9, which is an example of an energy-rich aqueous liquid.

Turning to the condensate 6, the (optionally treated) condensate water stream 6 is optionally filtered 110, thereby producing a filtration reject stream 14 and a filtrate 10, the filtrate being an example of an energy-rich process water filtrate stream. The reject stream 14 may be further processed or removed from the process depending on its value to the user. In the illustrated embodiment, the filtrate 10 is shown being optionally fed into a heated side of a membrane distillation unit 120. When present, the filtrate 10 is optionally distilled via membrane distillation by the at least one membrane distillation unit 120, thereby creating a membrane distillate (illustrated by the down arrows inside the membrane distillation unit 120, and which is collected and transported via stream 11) and a membrane distillation reject stream 12, which is an example of an energy-rich aqueous liquid.

As illustrated in FIG. 1, the membrane distillation reject streams 9 and 12 are then optionally combined with raw water 1. The combined stream is then preliminarily purified 130, thereby creating a preliminary purification reject (salinated) stream 3 and a purified stream 2, which is an example of a purified makeup water stream. The purified stream 2 may be split into multiple additional streams (shown but not numbered) in order to combine the purified makeup water (purified stream 2) with the membrane distillate created by the membrane distillation units 120. The purified stream 2 plus membrane distillates (streams 8 and 11) may be further combined with any other purified makeup water, thereby creating a boiler feed water 4, which is an example of a united makeup water stream. The boiler feed water 4 is then fed into the boiler system 100, which is an example of a thermal industrial water system.

Figure 2:
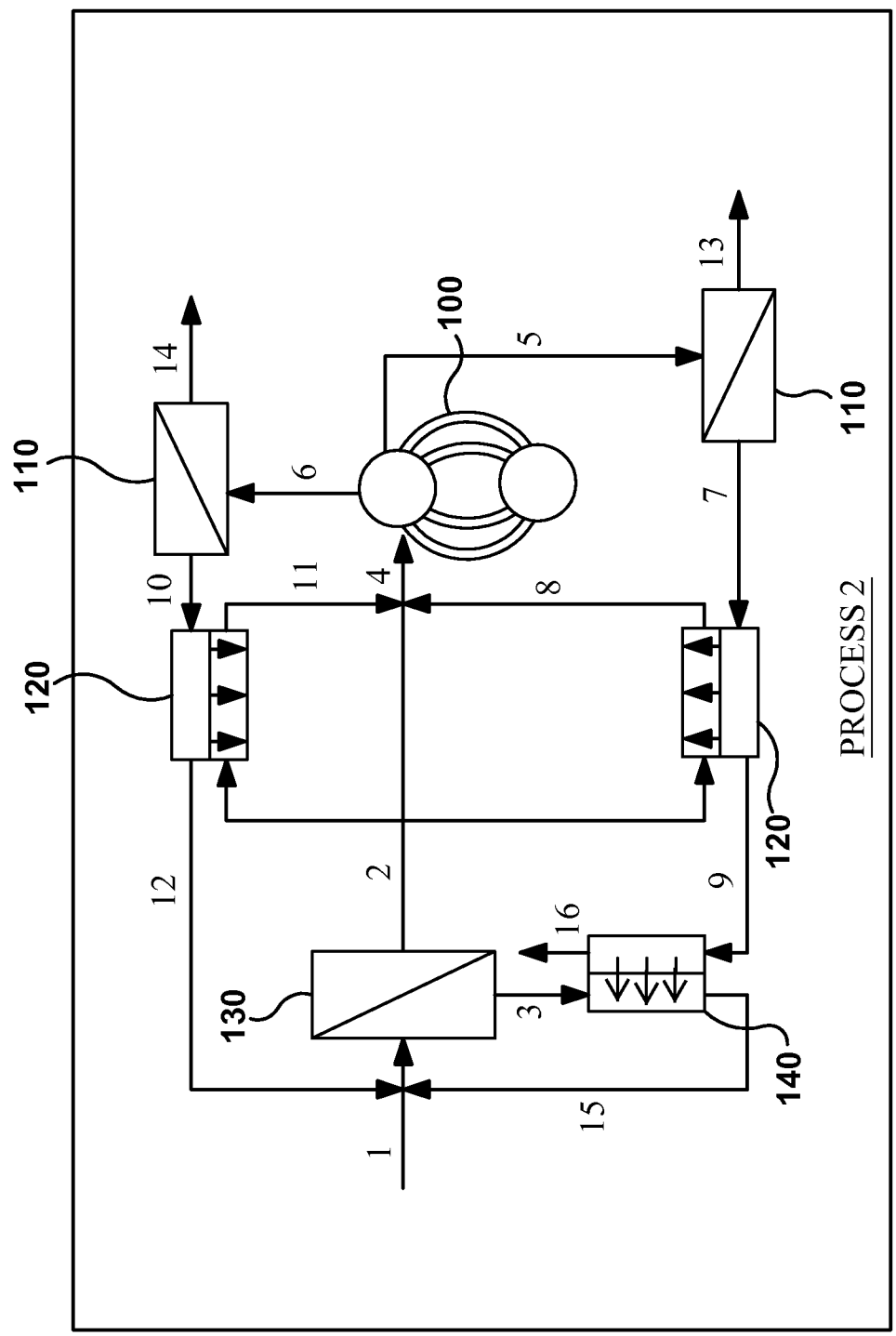
FIG. 2 illustrates a further embodiment of a system that can be used to carry out the methods of the present disclosure.

Turning to FIG. 2, FIG. 2 illustrates an embodiment of a system that can be used to carry out the methods of the present disclosure. For the illustrated embodiment of FIG. 2, a boiler system 100 produces steam (not shown). Liquid emissions of the boiler system 100 include blowdown 5 and condensate 6, each of which are examples of energy-rich process water streams, and each of which may be treated with a coagulant (not shown), a flocculant (not shown), and/or an adsorbent (not shown).

Turning to the blowdown 5, the (optionally treated) blowdown water stream 5 is optionally filtered 110, thereby producing a filtration reject stream 13 and a filtrate 7, the filtrate being an example of an energy-rich process water filtrate stream. The reject stream 13 may be further processed or removed from the process depending on its value to the user. In the illustrated embodiment, the filtrate 7 is shown being optionally fed into a heated side of a membrane distillation unit 120. When present, the filtrate 7 is optionally distilled via membrane distillation by the at least one membrane distillation unit 120, thereby creating a membrane distillate (illustrated by the up arrows inside the membrane distillation system 120, which is collected and transported in stream 8, and then 4) and a membrane distillation reject stream 9, which is an example of an energy-rich aqueous liquid.

For the embodiment of FIG. 2, the membrane distillation reject stream 9 is then optionally fed into a forward osmosis unit 140 as a relatively desalinated water stream, as opposed to the preliminary purification reject (salinated) stream 3 of purification 130. The purification reject stream 3 is used as a draw stream in the forward osmosis unit 140. The forward osmosis unit 140 produces a forward osmosis reject (concentrated) stream 16 and a diluted reject (diluted) stream 15, the second of which may be combined with raw water 1, and optionally with the condensate recovery membrane distillation reject stream 12 (an example of an energy-rich aqueous liquid, which is further described below).

Turning to the condensate 6, the (optionally treated) condensate water stream 6 is optionally filtered 110, thereby producing a filtration reject stream 14 and a filtrate 10, the filtrate being an example of an energy-rich process water filtrate stream. The reject stream 14 may be further processed or removed from the process depending on its value to the user. In the illustrated embodiment, the filtrate 10 is shown being optionally fed into a heated side of a membrane distillation unit 120. When present, the filtrate 10 is optionally distilled via membrane distillation by the at least one membrane distillation unit 120, thereby creating a membrane distillate (illustrated by the down arrows inside the membrane distillation system 120, which is collected and transported by stream 11, and then 4) and a membrane distillation reject stream 12, which is an example of an energy-rich aqueous liquid.

As previously mentioned, the diluted reject stream 15 and the condensate recovery membrane distillation reject stream 12 may be combined with raw water 1, thereby producing a combined stream (not labeled). The combined stream is then preliminarily purified 130, thereby creating the preliminary purification reject stream 3 and a purified stream 2, which is an example of a purified makeup water. The purified stream 2 may be split into multiple streams (shown but not numbered) in order to combine the purified stream with the membrane distillates created by the membrane distillation units 120. The purified makeup water and membrane distillates (streams 8 and 11) may be further combined with any other purified stream 2, thereby creating a boiler feed water 4, which is an example of a united makeup water stream. The boiler feed water 4 is then fed into the boiler system 100, which is an example of a thermal industrial water system.

Figure 3:
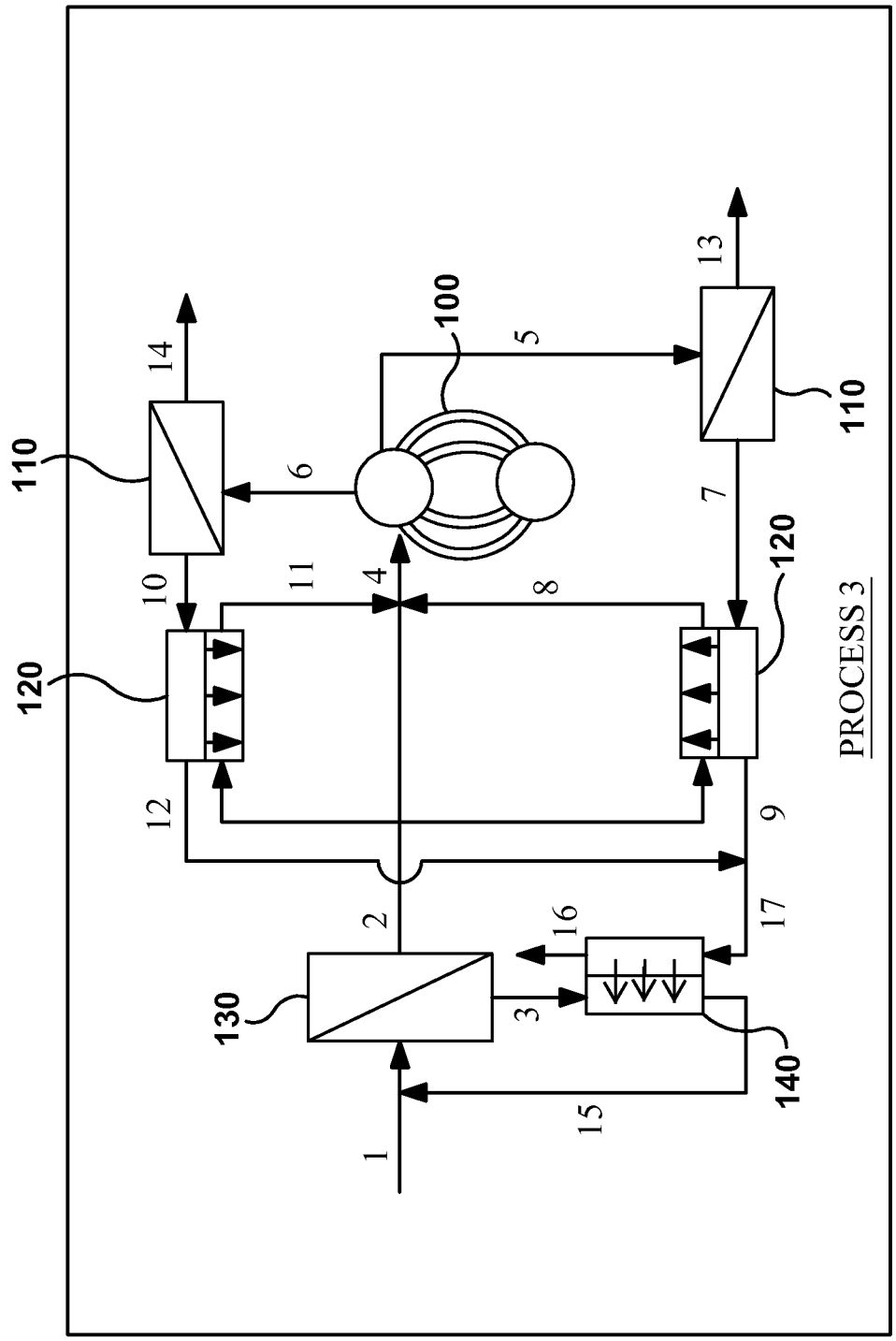
FIG. 3 illustrates yet a further embodiment of a system that can be used to carry out the methods of the present disclosure.

Turning to FIG. 3, FIG. 3 illustrates an embodiment of a system that can be used to carry out the methods of the present disclosure. For the illustrated embodiment of FIG. 3, a boiler system 100 produces steam (not shown). Liquid emissions of the boiler system 100 include blowdown 5 and condensate 6, each of which are examples of energy-rich process water streams, and each of which may be treated with a coagulant (not shown), a flocculant (not shown), and/or an adsorbent (not shown).

Turning to the blowdown 5, the (optionally treated) blowdown water stream 5 is optionally filtered 110, thereby producing a filtration reject stream 13 and a filtrate 7, the filtrate being an example of an energy-rich process water filtrate stream. The reject stream 13 may be further processed or removed from the process depending on its value to the user. In the illustrated embodiment, the filtrate 7 is shown being optionally fed into a heated side of a membrane distillation unit 120. When present, the filtrate 7 is optionally distilled via membrane distillation by the at least one membrane distillation unit 120, thereby creating a membrane distillate (illustrated by the up arrows inside the membrane distillation system 120, which is collected and transported in stream 8, and then 4) and a membrane distillation reject stream 9, which is an example of an energy-rich aqueous liquid.

Turning to the condensate 6, the (optionally treated) condensate water stream 6 is filtered 110, thereby producing a filtration reject stream 14 and a filtrate 10, the filtrate being an example of an energy-rich process water filtrate. The reject stream 14 may be further processed or removed from the process depending on its value to the user. In the illustrated embodiment, the filtrate 10 is shown being optionally fed into a heated side of a membrane distillation unit 120. When present, the filtrate 10 is optionally distilled via membrane distillation by the at least one membrane distillation unit 120, thereby creating a membrane distillate (illustrated by the down arrows inside the membrane distillation system 120, which is collected and transported in stream 11, and then 4) and a membrane distillation reject stream 12, which is an example of an energy-rich aqueous liquid.

For the embodiment of FIG. 3, the membrane distillation reject streams 9 and 12 may be combined into a blended stream 17 and fed into a forward osmosis unit 140 as a relatively desalinated water stream, as opposed to the preliminary purification reject stream 3. The preliminary purification reject stream 3 is used as a draw stream in the forward osmosis unit 140. The forward osmosis unit 140 produces a forward osmosis reject (concentrated) stream 16 and a diluted reject (diluted) stream 15, the second of which may be combined with raw water 1, thereby producing a combined water stream (not labeled).

The combined water stream is preliminarily purified 130, thereby creating the preliminary purification reject stream 3 and a purified stream 2, which is an example of a purified makeup water. The purified stream 2 may be split into multiple streams (shown but not numbered) in order to combine the purified makeup water with the membrane distillate created by the membrane distillation units 120. The purified makeup water and membrane distillates (streams 8 and 11) may be further combined with any other purified stream 2, thereby creating a boiler feed water 4, which is an example of a united makeup water stream. The boiler feed water 4 is then fed into the boiler system 100, which is an example of a thermal industrial water system.

While the figures illustrate several embodiments that may be capable of carrying out the methods of the present disclosure, the figures are not intended to limit the scope of the claims to any particular embodiment.

Blowdown recovery and condensate recovery are each discussed in greater detail below.

I. Blowdown Recovery

In certain embodiments, the energy-rich process water stream is blowdown water from a heated, pressurized thermal industrial water system. In certain embodiments, the heated, pressurized thermal industrial water system is a boiler system. In other embodiments, the heated, pressurized thermal industrial water system is a hot water circulation system, wherein the "hot water" comprises liquid water.

Industrial processes frequently require the generation of steam by a boiler as a necessity within their overall operation of producing goods or providing a service (e.g., comfort heating or cooling). While generating steam, a waste stream is common and typically necessary, taking the form of blowdown. As previously described, dirty water is removed from the operating boiler via blowdown. Without blowdown or some other form of removal, the dissolved and suspended solids in the water fed to the boiler system would continue to build to elevated concentrations, thereby causing scaling and/or corrosion problems that would be detrimental to safe and efficient boiler operation.

Pure or nearly pure water is generated by the boiler as steam, with contaminants becoming concentrated within the boiler. An appropriate blowdown procedure allows the undesirable contaminants to be limited so as to not exceed a concentration that would cause the aforementioned operational problems to occur. While rich with contamination, blowdown is also energy-rich with both thermal energy as well as mechanical energy via pressurization.

For most typical boiler systems, blowdown is simply discarded in some manner as a waste stream. The potential value of the water component of that stream is lost when discharged to a sewer or other effluent. In many cases the thermal and potential energy of the pressure is lost as the blowdown is discarded. Some boiler systems may be designed to recover a portion of the blowdown energy with use of flash steam separation or simple heat exchange with an energy-poor stream.

By the combination of various techniques, the methods of the present disclosure allow for recovery of water and energy from boiler and hot water blowdown in an efficient and practical manner. The recovery of energy has economic benefit to the industrial process as it will need to burn less fuel, and purchase or secure less incoming source water. Additionally the sustainability of the industrial process is improved as less water is removed from the aquifer or source and less discharge of pollutants to the water and air because less total fuel and energy was needed to operate the industrial plant.

An optional heat recovery unit operation by heat exchanger can be used to transfer the energy-rich useful heat from the blowdown to an energy-poor stream (not shown in the figures). Examples of heat exchangers include plate and frame, coil in tank, shell and tube, or other non-contacting heat recovery transfer between two fluids. An energy sink can be directed through the heat exchanger, allowing heat to transfer from the blowdown to the energy sink. In certain embodiments, the energy sink is a raw or makeup water stream. Either a stream being directly fed to the boiler or a sub-stream could be available for heat recovery, or the recirculation loop to a makeup holding tank could be utilized for heat recovery. The raw or makeup water stream is a typical and practical stream available in these industrial processes, but other energy-poor streams may be more conveniently located and could readily substitute in their place.

In certain embodiments, the heat exchanger is placed upstream from filtration. In certain other embodiments, the heat exchanger is placed downstream from filtration. In certain other embodiments, one or more heat exchangers may be employed upstream and downstream from filtration.

The theoretical advantage of placing the heat exchanger upstream is that the thermal energy of the eventual filtration reject (i.e., concentrate) stream is also transferred or recovered. The theoretical advantage for placing the heat recovery downstream of the filtration is that such an arrangement should reduce scale and/or deposits should not form as rapidly on the heat exchanger. Less scaling in the heat exchanger leads to greater recovery of energy from the blowdown and longer operation times between cleaning and/or servicing the heat exchanger.

In certain embodiments where a membrane distillation unit 120 (described in more detail below) is located downstream of a blowdown heat exchanger (not shown in the figures), the heat recovery should be limited such that the discharge temperature from the heat exchanger is at or just below the thermal application limit of the membrane(s) and the membrane distillation unit(s). In certain embodiments, a membrane distillation unit 120 is not employed. For such embodiments, the thermal recovery in the blowdown heat exchanger can be as complete as possible given the equipment and process variables employed.

Turning to the embodiments illustrated in FIGS. 1-3, in certain embodiments, the methods of the present disclosure utilize the mechanical energy-rich blowdown stream 5 by using the mechanical energy (i.e., pressure) to optionally drive the water through at least one filtration 110 that is capable of handling relatively high temperatures, in order to initially purify the blowdown. In certain embodiments, the at least one filtration comprises ultrafiltration ("UF"). In certain embodiments, the at least one filtration comprises microfiltration ("MF"). In certain embodiments, the at least one filtration comprises media filtration. In certain embodiments, no additional pumping energy is required to drive the filtration. The energy-rich, pressurized state of the blowdown provides essentially "free" ability to drive the filtration. The concentrated stream 13 from the filtration 110 may be further purified, recycled, or reused within the industrial process, or discharged. The filtrate 7 from the filtration 110 passes further down the recovery process of the methods of the present disclosure. For some thermal industrial water systems, one or more of the methods of the present disclosure may be practiced on one or multiple boilers, or the blowdown of several boilers may be combined to provide a common feed to the filtration. These options are not shown but would be readily apparent and within the scope of the present disclosure.

In order to deal with the elevated pressure typically found in blowdown, the user may have to employ pressure and back pressure controls to effectively carry out the methods of the present disclosure. Such controls may include the employment of one or more pressure reduction valves or throttling devices, each of which may be manually or automatically set and adjusted as necessary. Such controls are generally known in the art, and a person having skill in the art would be able to implement such controls without undue experimentation.

If sufficient blowdown mass flow exists, and the economic value or demand of water is great enough for a given industrial process, methods to recover water for recycle within the water-containing industrial process and/or thermal industrial water system may be advantageous. In certain embodiments, a membrane distillation unit 120 is employed. In certain embodiments, a membrane distillation unit 120 is located downstream from a filtration 110. In certain embodiments, a membrane distillation unit 120 is located downstream of both a filtration 110 and a heat exchanger (not shown). In certain embodiments, the membrane distillation unit 120 is selected from the group consisting of at least one direct contact membrane distillation unit, at least one vacuum membrane distillation unit, at least one air gap membrane distillation unit, at least one sweeping gas membrane distillation unit, and combinations thereof. In certain embodiments, the at least one membrane distillation unit is at least one direct contact membrane distillation unit ("DCMD").

When a membrane distillation unit 120 is employed, an (optionally treated) energy-rich process water stream from blowdown 5 (or filtrate 7) that has been conditioned not to exceed the filtration equipment's temperature limit(s) could be introduced into a membrane distillation unit 120 on a heated side of at least one membrane. A portion of pure water is evaporated across the membrane as membrane distillate (illustrated by the "up" arrows in the lower membrane distillation unit 120 of FIGS. 1-3, and which is collected and transported in stream 8, and then 4), leaving the remaining water and the contaminants in an energy-rich aqueous liquid 9. In certain embodiments, the membrane distillate (an evaporated and purified water) is condensed and collected by a recirculating or flowing stream of clean water (in certain embodiments, a purified makeup water stream 2, thereby creating a united makeup water stream 8, and then 4) on the non-heated side of the membrane, hence recovering water from the blowdown 5 and placing it into a part of the process that uses clean water. In certain embodiments, the membrane distillate is collected in a makeup water tank (not shown). Other parts of the water-containing industrial process and/or the thermal industrial water system and/or any other such process or system that uses pure water could use the membrane distillate alone or in combination with makeup water from another source.

In certain embodiments, preliminary purification 130 is used to initially purify raw water 1 for use in water-containing industrial processes and/or thermal industrial water systems. For blowdown water that has been sufficiently concentrated and for further water recovery, it may be possible to use forward osmosis 140 to recover even more purified water as illustrated in FIGS. 2 and 3. If the water-containing industrial process or thermal industrial water system has a stream more concentrated with dissolved (i.e., ionic) contaminants than the energy-rich aqueous liquid 9 exiting the membrane distillation unit 120 (i.e., concentrated blowdown), it can serve as the salinated (i.e., "draw") solution in the forward osmosis unit 140. One such potential source in a boiler system could be the preliminary purification reject (salinated) stream 3 from preliminary purification 130 used to purify raw water 1, which depends on the dissolved ionic content of the preliminary purification reject stream 3. At this point, the concentrated (i.e., discharge) stream 16 of the forward osmosis unit 140 would be considered waste or discharge from the boiler system. A diluted stream 15 is recovered from the draw stream 3 and the energy-rich aqueous liquid 9 by the forward osmosis unit 140, and could be combined with raw water 1 and fed to the preliminary purification 130.

II. Condensate Recovery

As previously discussed, FIGS. 1-3 illustrate recovery processes and recycle of both blowdown and condensate streams for a boiler system. A person of skill in the art will readily recognize that a user wishing to recover water and energy could employ either the blowdown recovery process, the condensate recovery process, or both. Furthermore, a person of skill in the art will readily recognize that the methods of the present disclosure could be implemented, for example, to recover condensate from a first process that is not necessarily a boiler system and return the recovered condensate to a second process, which may or may not be a boiler system.

In certain embodiments, the energy-rich process water is a condensate recovered from a heated, water-containing industrial process. In certain embodiments, the heated, water-containing industrial process creates steam that condenses into condensate. In certain embodiments, the condensate becomes contaminated and hence becomes dirty condensate. In certain embodiments, the heated, water-containing industrial process is a heated thermal industrial water system. In certain embodiments, the heated, water-containing industrial process is a boiler system. In certain embodiments, the energy-rich process water stream is a condensate water stream from a water-containing industrial process selected from the group consisting of a boiler system; food processing; dairy processing; beverage processing; landfill leachate processing; biofuel processing; and combinations thereof. In certain embodiments, the water-containing industrial process is food or beverage processing. In certain embodiments, the food or beverage processing is at least one process selected from the group consisting of: coffee processing, sugar processing, milk processing, whey processing, soup processing, beverage processing, and tomato processing.

Steam may be produced in water-containing industrial processes and thermal industrial water systems for a variety of purposes. Steam may be a byproduct of an industrial process. Steam makes a generally safe and economical fluid stream to transfer energy into an industrial process at points where heat is needed in the process. Examples include but are not limited to the following: heating a system or stream using a heat exchanger, sparging steam into a process, and heating a building or enclosed space. Another use for steam includes applying its mechanical energy to drive a machine. Typical examples include but are not limited to driving a turbine or piston engine. In other processes, the steam generators are actually used to cool some other hot industrial process, whereby heat is removed from the hot industrial process and transferred to liquid water to make steam.

In many cases, the steam condenses to liquid form thereby forming a condensate. The condensate is of high economical and practical value to the utility operation because the condensate is energy-rich in most cases compared to an energy sink. In addition, the condensate, or at least a portion of the condensate, is of high quality and purity such that it can be reused in the boiler system with little or no further treatment. The return of this energy-rich and high purity condensate is called the condensate return. For the typical condensate of a boiler system, the condensate is collected where practical and returned to the boiler system for reuse. The overall economic and thermal efficiency of the boiler system is highly influenced by the amount of condensate that is returned to the boiler system. The higher the mass flow of condensate return, the greater the overall efficiency and thus lower operating cost seen by the powerhouse and utility operation.

One key measure for boiler system operators is the percentage of condensate that is returned to the boiler. This is frequently measured as the amount of total condensate mass flow returned to the boiler divided by the total makeup water mass flow required to keep the boiler operating. Condensate return rates between 30 and 95% are typical, while some even exceed 99%+ for utility power plants.

Although condensate generally has great thermal value, in some cases some portion of the condensate becomes contaminated by various industrial or utility operations to the point where it should not be directly returned to the boiler system without further purification. Non-limiting examples of condensate contamination include corrosion product from the boiler system; contaminants leaked from the industrial process to the condensate either through defect, neglect, or poor operation; or specific chemical treatment added for a certain section of the plant that may be detrimental to the boiler system. Such contaminated condensate is frequently discarded by the plant into a municipal sewer or waste treatment facility. In some cases, the contaminated condensate may be sent to other areas of the plant that are able to tolerate such the contaminants. However, when such an alternate reuse is employed, the thermal energy of the contaminated condensate may be lost. Therefore, while the clean condensate is typically reused by a boiler system, the contaminated condensate is typically removed from the boiler system.

The present disclosure is directed toward methods beyond those or in addition to those that may be employed to determine whether the condensate is contaminated. A method that may be used to determine actual or potential contamination could employ the use of fluorometric technology (e.g., 3D TRASAR® Technology, available from Nalco Company). For example, Nalco offers boiler treatment that contains at least one chemically inert fluorescent tracer that under normal operation should not be found or found in very low concentrations in clean condensate. If there are significant problems with the boiler operation leading to liquid entrainment and there are known contaminants in the boiler water, the fluorescence measurement can be used to detect these events and mark the condensate as dirty. Such dirty condensate could then be diverted for treatment prior to being reintroduced into the boiler system.

Another technology that may be used to distinguish dirty condensate from clean condensate, for example, may employ the Nalco Corrosion Stress Monitor device. Such a device could be employed in a condensation recovery system to determine whether a particular condensate will need treatment in order to be returned to a boiler system.

The segregated and consolidated dirty condensate may generally be stored in a vessel, but, with sufficient mass flow, the vessel could take the form of a continuously flowing pipe. The inclusion of the vessel allows for non-continuous (e.g., batch, semi-batch, or semi-continuous) condensate processing and/or purification. The vessel would also provide greater flexibility to the plant in balancing and managing water flows throughout the entire system. In such an embodiment, the dirty condensate tank and piping would be insulated to minimize the thermal energy loss from this energy-rich stream.

It is envisioned that any aqueous condensate can be processed via the methods of the present disclosure, whether it be clean, dirty, or a combination of clean and dirty. Clean condensate is typically sent directly back to the boiler system at or before a deaeration device, or to the makeup tank if no deaeration device is present. In certain embodiments, all condensate is processed via the methods of the present disclosure. In certain embodiments, dirty condensate (known or suspected) can be sent to a separate vessel or stream for processing according to the methods of the present disclosure. Unless expressly recited in the claims, the disclosure should not be interpreted as requiring isolation of dirty condensate from clean condensate prior to being processed by the methods disclosed herein.

While advantages may exist in separately treating blowdown and condensate, in certain embodiments, it may be more practical to combine blowdown with condensate and feed the combined streams into the embodiments of the presently disclosed methods.

Turning to FIGS. 1-3, the upper stream leaving the boiler represents condensate 6. If the condensate 6 has a substantial particulate (non-dissolved) contamination concentration, the particulate contamination concentration may need to be reduced before removing the dissolved contaminants. The optional use of filtration 110, membrane or otherwise, may be the most efficient way to remove at least a portion of the particulates. For a non- or minimally-pressurized stream, a pump (not shown) would be a reasonable way to provide sufficient feed pressure to achieve sufficient flux across the filtration 110 (unlike the previously discussed blowdown). Although the condensate is energy-rich, it will not likely have the elevated pressure of the blowdown, and thus pumping may be required. With sufficient mass flow of discharge stream 14 from the filtration 110, when present, a heat recovery exchanger (not shown) on the discharge stream 14 may provide economic benefit from the heat of the separated contaminants. The practical use of this exchanger is tied to the scale of the operation. The higher the total dirty condensate 6 mass flow and the hotter its temperature (i.e., greater thermal energy), the more economical and beneficial the heat recovery at this stage would be.

If sufficient condensate 6 mass flow exists, and the economic value or demand of water is great enough for a given water-containing industrial process, methods to recover water for recycle within the water-containing industrial process and/or thermal industrial water system may be advantageous. In certain embodiments, an optional membrane distillation unit 120 is employed. In certain embodiments, a membrane distillation unit 120 is located downstream from the filtration 110, when present. In certain embodiments, a membrane distillation unit 120 is located downstream of both filtration 110 and a heat exchanger (not shown). In certain embodiments, the membrane distillation unit 120 is selected from the group consisting of at least one direct contact membrane distillation unit, at least one vacuum membrane distillation unit, at least one air gap membrane distillation unit, at least one sweeping gas membrane distillation unit, and combinations thereof. In certain embodiments, the membrane distillation unit 120 is a DCMD.

When a membrane distillation unit 120 is employed, hot water from a condensate stream 6 that has been filtered by the filtration 110 and conditioned not to exceed the membrane and system temperature limit(s) (stream 10) could be introduced into a membrane distillation unit 120. A portion of pure water is evaporated across the membrane as membrane distillate (illustrated by the down arrows in the upper membrane distillation unit 120 of FIGS. 1-3, and collected and transported by stream 11), leaving the remaining water and the contaminants in an energy-rich aqueous liquid 12. The membrane distillate is condensed and collected by a recirculating or flowing stream of clean water 2 (in certain embodiments, a purified makeup water 2, thereby creating a united makeup water stream 11, and then 4) on the other side of the membrane, hence recovering water from the condensate 6 and placing it into a part of the process that uses clean water. In certain embodiments, the membrane distillate is collected in a makeup water tank (not shown). Other parts of the water-containing industrial process and/or the thermal industrial water system and/or any other such process or system that uses pure water could use the membrane distillate alone or in combination with makeup water.

In certain embodiments, preliminary purification 130 is used to purify raw water 1 for use in water-containing industrial processes and/or thermal industrial water systems. For condensate that has been sufficiently concentrated, it may be possible to use forward osmosis to recover even more purified water, particularly when preliminary purification 130 is reverse osmosis or ion exchange. In certain embodiments, the methods of the present disclosure do not employ a forward osmosis unit 140. In certain embodiments, only the condensate recovery or only the blowdown recovery employs the use of a forward osmosis unit 140. In certain embodiments, the blowdown water and the condensate water are not combined, and either the blowdown water, the condensate water, or each employs individual forward osmosis units 140 (only one shown). In certain embodiments, the forward osmosis unit 140 has been previously described for the blowdown, where the concentrated blowdown and the condensate streams are combined, such as, FIG. 3, streams 9 and 12, forming stream 17. If the water-containing industrial process or thermal industrial water system has a stream more concentrated with dissolved (i.e., ionic) contaminants than the concentrated blowdown 9 and/or condensate 12 (both being energy-rich aqueous liquids), either stream or a stream combining the two (e.g., FIG. 3 stream 17) can serve as the feed solution in the forward osmosis unit 140. One potential draw stream could be the preliminary purification reject stream 3, particularly when the preliminary purification 130 is performed using reverse osmosis and/or ion exchange. At this point, the concentrated stream 16 of the forward osmosis unit 140 should be more concentrated than the energy-rich aqueous liquid 12 (or combined stream 17). The concentrated stream 16 would likely be waste and discharged. Diluted stream 15 of the forward osmosis unit 140 could be optionally combined with raw water 1 and fed to the preliminary purification 130.

All patents referred to herein, are hereby incorporated herein by reference, whether or not specifically done so within the text of this disclosure.

To the extent that the terms "include," "includes," or "including" are used in the specification or the claims, they are intended to be inclusive in a manner similar to the term "comprising" as that term is interpreted when employed as a transitional word in a claim. Furthermore, to the extent that the term "or" is employed (e.g., A or B), it is intended to mean "A or B or both A and B." When the applicants intend to indicate "only A or B but not both," then the term "only A or B but not both" will be employed. Thus, use of the term "or" herein is the inclusive, and not the exclusive use. See Bryan A. Garner, A Dictionary of Modern Legal Usage 624 (2d ed. 1995). Also, to the extent that the terms "in" or "into" are used in the specification or the claims, it is intended to additionally mean "on" or "onto." Furthermore, to the extent that the term "connect" is used in the specification or the claims, it is intended to mean not only "directly connected to," but also "indirectly connected to" such as connected through another component or components. In the present disclosure, the words "a" or "an" are to be taken to include both the singular and the plural. Conversely, any reference to plural items shall, where appropriate, include the singular.

All ranges and parameters disclosed herein are understood to encompass any and all sub-ranges assumed and subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g., 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

While the present disclosure has been illustrated by the description of embodiments thereof, and while the embodiments have been described in considerable detail, it is not the applicants' intent to restrict or in any way limit the scope of the appended claims to such detail. Additional advantages and modifications will readily appear to those skilled in the art. Therefore, the disclosure, in its broader aspects, is not limited to the specific details, the representative apparatuses, or the illustrative examples shown and described. Accordingly, departures may be made from such details without departing from the spirit or scope of the applicants' general inventive concept.

The invention claimed is:

1. A method for improving efficiency of a water-containing industrial process, the method comprising:
feeding energy-rich process water or energy-rich process water filtrate formed by filtering energy-rich process water to a membrane distillation unit, thereby creating a membrane distillate and an energy-rich aqueous liquid;
purifying the energy-rich aqueous liquid using a salinated liquid as a draw stream in a forward osmosis unit, thereby creating a diluted stream;
preliminarily purifying a stream comprising at least one of the energy-rich aqueous liquid and the diluted stream using a technique selected from the group consisting of: reverse osmosis, ion exchange, water softening, and combinations thereof, thereby creating purified water;
feeding the purified water and the membrane distillate into at least one heated thermal industrial water system.

2. The method of claim 1, wherein the energy-rich process water is discharged from the heated thermal industrial water system.

3. The method of claim 1, wherein the at least one heated thermal industrial water system is a boiler system, and the purified makeup water stream and the membrane distillate stream are combined into a single stream prior to being fed into the boiler system.

4. The method of claim 1, wherein the energy-rich process water is a blowdown water from a boiler system.

5. The method of claim 1, wherein the energy-rich process water is a condensate water from an industrial process selected from the group consisting of a boiler system; food processing; dairy processing; beverage processing; landfill leachate processing; biofuel processing; and combinations thereof.

6. The method of claim 1, wherein the optional filtering is present and, prior to filtering, the energy-rich process water is treated with a compound selected from the group consisting of a coagulant, a flocculant, an adsorbent, and combinations thereof.

7. The method of claim 1, wherein the stream being preliminarily purified further comprises raw water.

8. The method of claim 1, wherein the preliminary purification technique is reverse osmosis.

9. A method for improving efficiency of a water-containing industrial process, the method comprising:
treating energy-rich process water with a compound selected from the group consisting of a flocculant, a coagulant, an adsorbent, and combinations thereof, thereby creating treated energy-rich process water;
feeding the energy-rich process water, the treated energy-rich process water, or energy-rich process water filtrate formed by filtering the energy-rich process water or the treated energy-rich process water to a membrane distillation unit, thereby creating a membrane distillate and an energy-rich aqueous liquid;
purifying the energy-rich aqueous liquid using a salinated liquid as a draw stream in a forward osmosis unit, thereby creating a diluted stream;
preliminarily purifying a stream comprising the diluted stream using a technique selected from the group consisting of: reverse osmosis, ion exchange, water softening, and combinations thereof, thereby creating a purified water;

feeding the purified water and the membrane distillate into at least one heated thermal industrial water system.

10. The method of claim 9, wherein the filtering is present and utilizes at least one of ultrafiltration, microfiltration, media filtration, and combinations thereof.

11. The method of claim 9, wherein the stream being purified further comprises raw water.

12. The method of claim 9, wherein the salinated liquid comprises a reverse osmosis reject stream.

13. The method of claim 9, wherein the forward osmosis unit is operated in forward osmosis mode.

14. The method of claim 9, wherein the forward osmosis unit is operated in pressure retarded osmosis mode.

15. The method of claim 9, wherein the optional filtering is present and, prior to filtering, the energy-rich process water is treated with a compound selected from the group consisting of a coagulant, a flocculant, an adsorbent, and combinations thereof.

16. The method of claim 9, wherein the preliminary purification technique is reverse osmosis.

17. A method for improving efficiency of a heated thermal industrial water system, the method comprising:

optionally treating energy-rich process water from a boiler system with a compound selected from the group consisting of a flocculant, a coagulant, an adsorbent, and combinations thereof, thereby creating treated energy-rich process water;

filtering energy-rich process water or the treated energy-rich process water, thereby creating an energy-rich process water filtrate;

feeding the energy-rich process water filtrate to a membrane distillation unit, thereby creating a membrane distillate and an energy rich aqueous liquid;

purifying the energy-rich aqueous liquid using a salinated liquid as a draw stream in a forward osmosis unit, thereby creating a diluted stream;

preliminarily purifying raw water and the diluted stream using reverse osmosis, thereby creating a purified water and a reverse osmosis reject stream, wherein the reverse osmosis reject stream is capable of serving as the salinated liquid that is fed into the forward osmosis unit;

feeding the purified water and the membrane distillate into the boiler system.

18. The method of claim 17, wherein the energy-rich process water is blowdown water from the boiler system.

19. The method of claim 17, wherein the energy-rich process water or the treated energy-rich process water is filtered using at least one of ultrafiltration, microfiltration, media filtration, and combinations thereof.

20. The method of claim 17, wherein the energy-rich process water is treated with a compound selected from the group consisting of a coagulant, a flocculant, an adsorbent, and combinations thereof.

* * * * *